Patented June 29, 1926.

1,590,685

UNITED STATES PATENT OFFICE.

RICHARD HERZ AND WALTER BRUNNER, OF FRANKFORT-ON-THE-MAIN, GERMANY, ASSIGNORS TO GRASSELLI DYESTUFF CORPORATION, OF NEW YORK, N. Y., A CORPORATION OF DELAWARE.

VIOLET VAT DYESTUFFS OF THE 2-THIONAPHTHENE-2-INDOLINDIGO SERIES.

No Drawing. Application filed February 11, 1926, Serial No. 87,676, and in Germany November 6, 1924.

Our invention relates to the production of new violet vat dyestuffs of the 2-thionaphthene-2-indolindigo series, resulting from the condensation of oxythionaphthene-derivatives, corresponding probably to the general formula:

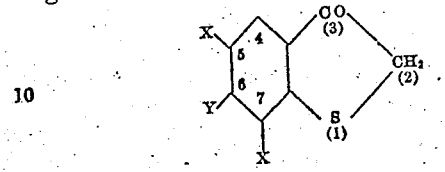

(wherein X means a halogen or an alkyl group, Y means hydrogen, which may be substituted by a halogen or an alkyl group), with an α-isatin-body of the general formula:

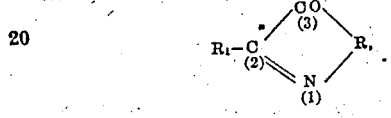

(wherein R means an aryl residue, which may contain further substituents, $R_1$ means a halogen or an arylido group).

Especially valuable dyestuffs are obtained according to this process if in the condensation as one component an oxythionaphthene-derivative of the general formula:

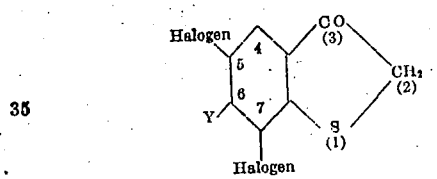

(wherein Y means hydrogen which may be substituted by a halogen or an alkyl group), as the other component an α-isatin-body of the general formula:

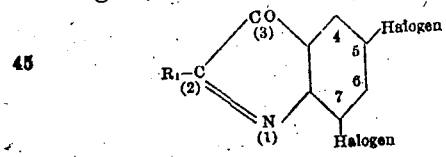

(wherein $R_1$ means a halogen or an arylido group) are used.

Dyestuffs of a similar character are formed if the condensation of the above named oxythionaphthene-derivatives is carried out with unhalogenized α-isatin bodies and the dyestuffs, thus obtained, are then treated with a suitable halogenating agent.

The present dyestuffs corresponding probably to the general formula:

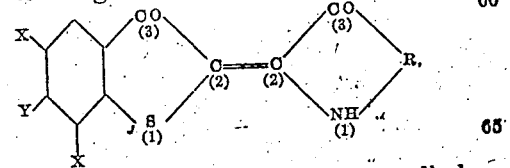

(wherein X means a halogen or an alkyl group, Y means hydrogen which may be substituted by a halogen or an alkyl group and R means an aryl residue which may contain further substituents) are new compounds and surpass the dyestuffs of the 2-thionaphthene-2-indolindigo series which are known hitherto by their exceptional brightness of shade and their excellent fastness to light. They are fully equal in this respect to the best violet dyestuffs of the anthraquinone-series, but surpass these by their particular qualification for printing, because their fixation on the fiber is easy and their dyeings are easily discharged to a pure white.

The cotton and wool fabrics, dyed or printed with the present dyestuffs, also form a part of the present invention.

The above named oxythionaphthene-derivatives are new bodies. A general well working method of producing them is the following:

Starting from the corresponding substituted arylamins by transforming them into the corresponding substituted arylthioglycollic acids and forming the ring either by treating the latter with suitable acid condensing agents, preferably with chlorosulfonic acid in the cold, or by converting the substituted arylthioglycollic acids into the corresponding chlorides (by treating them with phosphorus trichloride or thionyl chloride) and treating the latter with suitable condensing agents, preferably with anhydrous aluminium-chloride, phosphorus pentoxide and others in the known manner.

Thus for instance 5.7-dichloro- and 5.7- dibromooxythionaphthene may be prepared by transforming 2.4-dichloro- and 2.4-dibromoanilin into the 2.4-dichloro-. and 2.4-dibromophenyl-1-thioglycollic acids, converting these into the corresponding chlorides by heating them with phosphorus trichloride and by forming the ring by means of aluminium-chloride, phosphorus-pentoxide and others or by treating the above named thioglycollic acids with acid condensing agents at low temperatures, preferably with chlorosulfonic acid. The 5.7-dichlorooxythionaphthene, thus obtained, crystallizes from benzene as yellow needles, melting at 140–143° C.

5.6.7-trichlorooxythionaphthene may be prepared in the same manner, starting from 2.3.4-trichloroanilin. It crystallizes from benzene as feebly yellowish needles, melting at 150–153° C.

The alkylhalogeno-oxythionaphthenes may be obtained in an analogous manner, starting from the corresponding halogenated tolylthioglycollic acids.

So f.i. the 5-chloro-7-methloxythionaphthene may be prepared by starting from the thioglycollic acid of the formula:

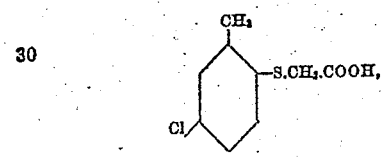

which is obtainable from 5-chloro-2-toluidin. It forms in a pure state feebly yellowish needles, melting at 106–108° C. The isomeric 5-methyl-7-chloro-oxythionaphthene is formed in an analogous manner, starting from 3-chloro-4-toluidin of the formula:

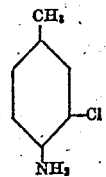

it crystallizes from water or benzene as leaflets, melting at 120–123° C.; the 5.7-dichloro-6-methyl-oxythionaphthene may be prepared for instance starting from 1-methyl-2.6-dichloro-3-aminobenzene, according to the same process; it crystallizes in yellowish leaflets, melting at 110° C.

The following examples illustrate the nature of our invention and in what manner it is to be performed, the parts being by weight and all temperatures in centigrades.

*Example 1.*

9.3 parts of 5.7-dibromoisatin are suspended in about 50 parts of chlorobenzene. Then 9 parts of phosphorus pentachloride are added and the mass is heated, until the formation of the chloride is finished. To this solution a solution of 6.6 parts of 5.7-dichlorooxythionaphthene in about the tenfold quantity of chlorobenzene is added and the mixture is heated for some hours to about 60–70° C. When the condensation is finished and the mass is cooled down, the separated dyestuff is filtered off and washed with chlorobenzene, at last with alcohol. The reactions which take place in the formation of the dyestuff are probably as follows:

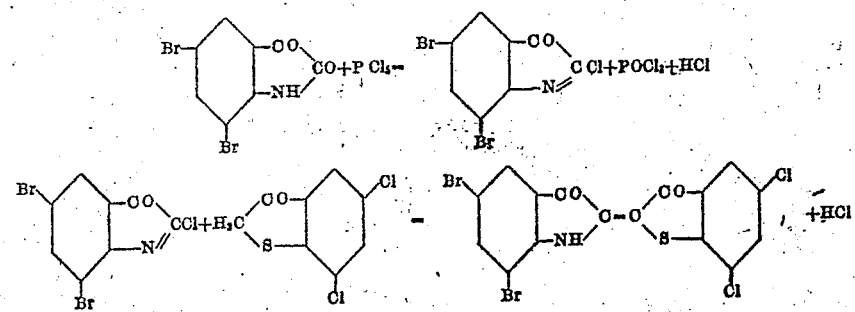

It forms when dry a dark violet powder, soluble in cold concentrated sulfuric acid to a bluish black, in warm concentrated sulfuric acid to a bluish green solution. With alkaline hydrosulfit it yields an orange vat, and dyes in such a vat cotton and wool in bluish violet shades. The dyeings thus produced are distinguished by their excellent fastness to washing, light and chlorine.

If in this process instead of 5.7-dibromoisatinchloride the corresponding amount of 5.7-dichloroisatinchloride is used and if the 5.7-dichlorooxythionaphthene is replaced by the equivalent amount of 5.6.7-trichlorooxy-thionaphthene a dyestuff is obtained, dyeing in bluish violet shades which are distinguished by their unusual brightness and by their excellent fastness to light.

Identical dyestuffs are formed by using instead of the derivatives of α-isatin-chloride the corresponding derivatives of α-isatin arylides.

*Example 2.*

276 parts of 5.6.7-trichlorooxythionaphthene and 222 parts of α-isatinanilid are introduced in about 2000 parts of xylene or chlorobenzene or in a similarly acting solvent or diluent and the mixture is then heated for some hours while stirring, until the formation of the dyestuff is finished. The dyestuff which separates when cold is filtered off and dried. It is probably formed in accordance with the following reaction:

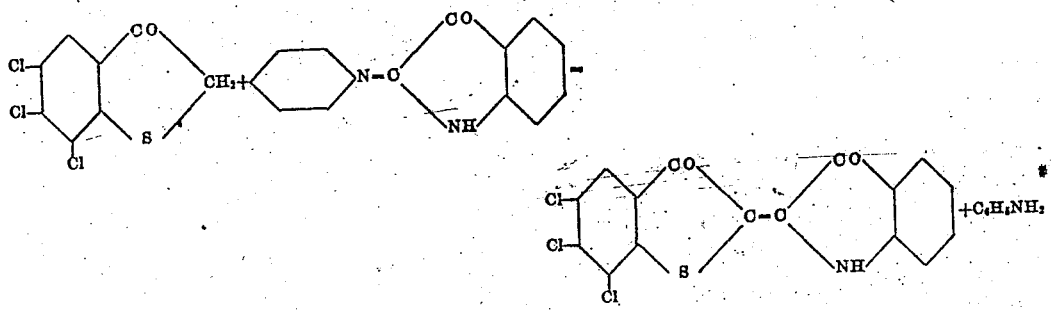

382 parts of this dyestuff are dissolved in about 5000 parts of concentrated sulfuric acid at about 20° C. and 320 parts of bromine are added. After some hours the temperature is increased to about 80° C. and heating is continued at this temperature, until the reaction is finished. Then the mass is poured on ice, the precipitate is filtered off and washed.

The product, thus obtained, dyes cotton and wool in similar shades as the dyestuff formed by condensing 5.6.7-trichlorooxythionaphthene with 5.7-dibromo-α-isatinanilid.

Example 3.

10 parts of 5.7-dibromoisatin are suspended in about 50 parts of chlorobenzene, then 9 parts of phosphorus pentachloride are added and the mixture is heated, until the formation of the 5.7-dibromo-α-isatin chloride is finished. A solution of 7.5 parts of 5-chloro-7-methyl-oxythionaphthene in about the tenfold quantity of chlorobenzene is added and the mixture is heated on the water-bath for some hours. The dyestuff, thus formed, separates in a crystalline state, it is filtered off, washed and dried. It probably has the formula:

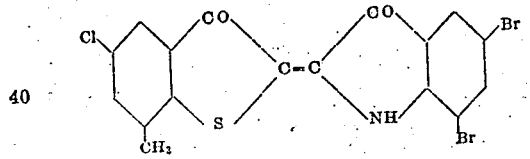

In order to obtain it in a state easy to be vatted it is dissolved in concentrated sulfuric acid and the solution, thus obtained, is poured on ice, filtered again and washed until the precipitate is neutral.

The dyestuff is, when dry, a violet powder, it dissolves in sulphuric acid monohydrate with a dark bluish green color and forms with an alkaline hydrosulfit solution an orange-yellow vat, and dyes cotton and wool in such a vat in full reddish violet shades. The dyeings are fast to washing, light and chlorine.

Dyestuffs with similar dyeing properties are obtained by condensing in an analogous manner 5-methyl-7-chloro-oxythionaphthene or 5.7-dichloro-6-methyl-oxythionaphthene with 5.7-dibromo- or 5.7-dichloro-α-isatinchloride.

Identical dyestuffs are formed, if instead of the mentioned α-isatin chloride derivatives the corresponding α-isatin arylide-derivatives are used.

Having now particularly described and ascertained the nature of our said invention and in what manner the same is to be performed we declare that what we claim is:—

1. As new compounds violet vat dyestuffs of the 2-thionaphthene-2-indolindigo series corresponding probably to the general formula:

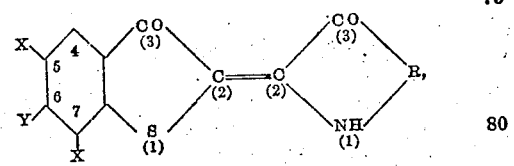

wherein X means a halogen or an alkyl group, Y means hydrogen, which may be substituted by a halogen or an alkyl group and R means an aryl residue, which may contain further substituents, which are when dry violet powders, soluble in cold concentrated sulfuric acid to a greenish to bluish, in warm concentrated sulfuric acid to a bluish green solution, which are separated therefrom by water in violet flakes, yielding with alkaline hydrosulfit a yellow to orange vat, from which cotton and wool is dyed in full violet to bluish violet shades of an excellent fastness especially to light, which dyestuffs are substantially identical with dyestuffs obtainable from oxythionaphthene-derivatives, corresponding probably to the general formula:

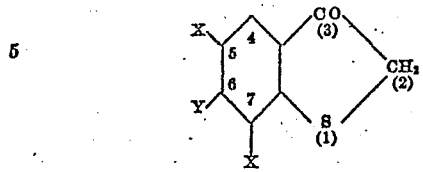

wherein X means a halogen or an alkyl group, Y means hydrogen, which may be substituted by a halogen or an alkyl group, by condensing them with an α-isatin body of the general formula:

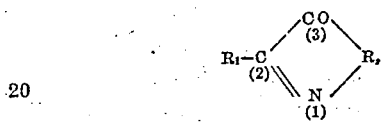

wherein R means an arylresidue, which may contain further substitutents, $R_1$ means a halogen or an arylido group.

2. As new compounds violet vat dyestuffs of the 2-thionaphthene-2-indolindigo series corresponding probably to the general formula:

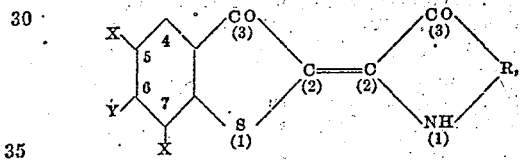

wherein X means a halogen or an alkyl group, Y means hydrogen, which may be substituted by a halogen or an alkyl group and R means a halogenated arylresidue, which are when dry violet powders, soluble in cold concentrated sulfuric acid to a greenish to bluish, in warm concentrated sulfuric acid to a bluish green solution, which are separated therefrom by water in violet flakes, yielding with alkaline hydrosulfit a yellow to orange vat, from which cotton and wool is dyed in full violet to bluish violet shades of an excellent fastness especially to light, which dyestuffs are substantially identical with dyestuffs obtainable from oxythionaphthene derivatives, corresponding probably to the general formula:

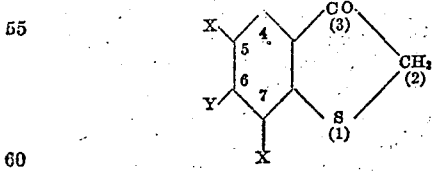

wherein X means a halogen or an alkyl group, Y means hydrogen, which may be substituted by a halogen or an alkyl group, by condensing them with an α-isatin body of the general formula:

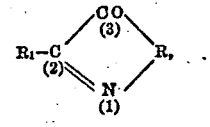

wherein R means a halogenated arylresidue, $R_1$ a halogen or an arylido group.

3. As new compounds violet vat dyestuffs of the 2-thionaphthene-2-indolindigo series corresponding probably to the general formula:

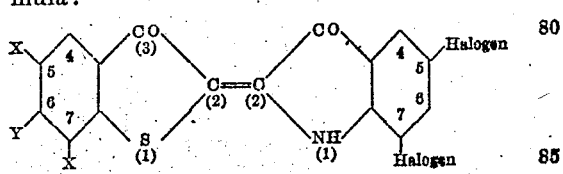

wherein X means a halogen or an alkyl group, Y means hydrogen, which may be substituted by a halogen or an alkyl group, which are when dry violet powders, soluble in cold concentrated sulfuric acid to a greenish to bluish, in warm concentrated sulfuric acid to a bluish green solution, which are separated therefrom by water in violet flakes, yielding with alkaline hydrosulfit a yellow to orange vat, from which cotton and wool is dyed in full violet to bluish violet shades of an excellent fastness especially to light, which dyestuffs are substantially identical with dyestuffs obtainable from from oxythionaphthene-derivatives, corresponding probably to the general formula:

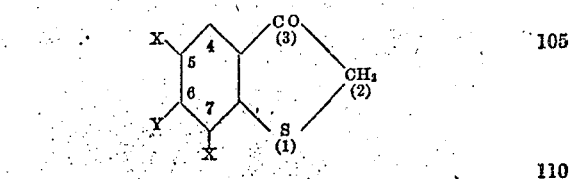

wherein X means a halogen or an alkyl group, Y means hydrogen, which may be substituted by a halogen or an alkyl group, by condensing them with an α-isatin-body of the general formula:

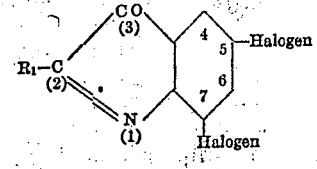

$R_1$ means a halogen or an arylido group.

4. As new compounds violet vat dyestuffs of the 2-thionaphthene-2-indolindigo series corresponding probably to the general formula:

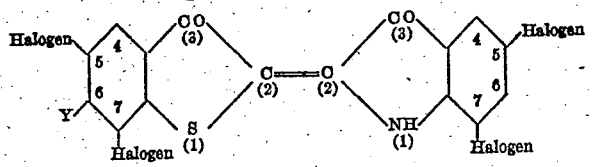

wherein Y means hydrogen, which may be substituted by a halogen or an alkyl group, which are when dry violet powders, soluble in cold concentrated sulfuric acid to a black-green, in warm concentrated sulfuric acid to a bluish-green solution, which are separated therefrom by water in violet flakes, yielding with alkaline hydrosulfit a golden yellow to yellowish orange vat from which cotton and wool is dyed in reddish violet to blue violet shades of an excellent fastness especially to light, which dyestuffs are substantially identical with dyestuffs obtainable from oxythionaphthene-derivatives, corresponding probably to the general formula:

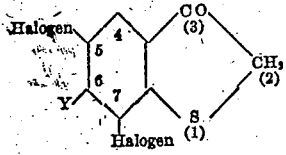

wherein Y means hydrogen, which may be substituted by a halogen or an alkyl group, by condensing them with an α-isatin body of the general formula:

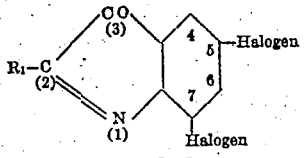

wherein $R_1$ means a halogen or an arylido group.

5. As a new compound a violet vat dyestuff of the 2-thionaphthene-2-indolindigo series corresponding probably to the formula:

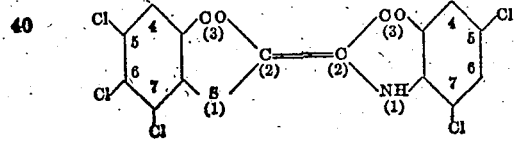

which is when dry a violet powder, soluble in cold concentrated sulfuric acid to a bluish black, in warm concentrated sulfuric acid to a bluish green solution, which is separated therefrom in violet flakes, yielding with alkaline hydrosulfit an orange vat, from which cotton and wool is dyed in brilliant bluish violet shades of an excellent fastness, especially to light, which dyestuff is substantially identical with the dyestuff obtainable from

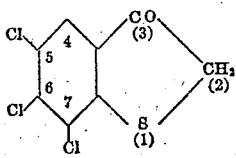

by condensing it with an α-isatin body of the formula:

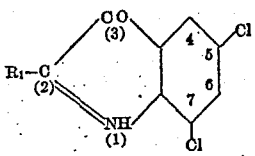

wherein $R_1$ means a halogen or an arylido group.

6. Textile material dyed with the dyestuffs as claimed in claim 1.
7. Textile material dyed with the dyestuffs as claimed in claim 2.
8. Textile material dyed with the dyestuffs as claimed in claim 3.
9. Textile material dyed with the dyestuffs as claimed in claim 4.
10. Textile material dyed with the dyestuff as claimed in claim 5.

In testimony whereof we affix our signatures.

RICHARD HERZ.
WALTER BRUNNER.